Dec. 3, 1929.    E. F. H. ENNA    1,737,577
APPARATUS FOR CUTTING CHANNELS IN PARTS OF FOOTWEAR
Filed Aug. 11, 1927    3 Sheets-Sheet 3
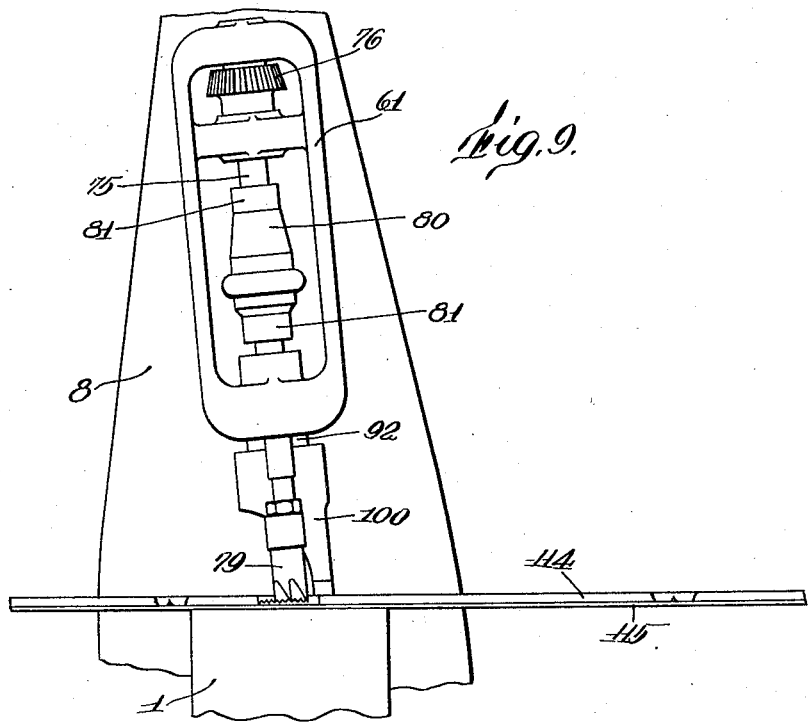
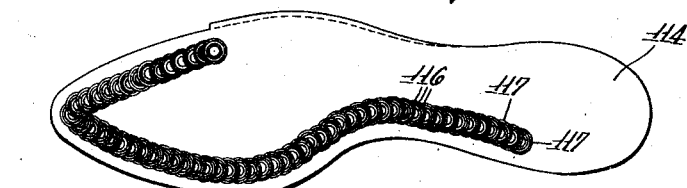
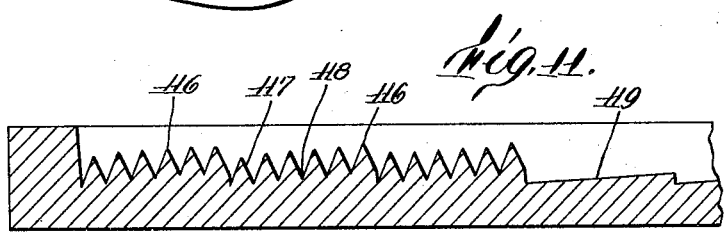
Inventor:
Ernst F. H. Enna Patented Dec. 3, 1929

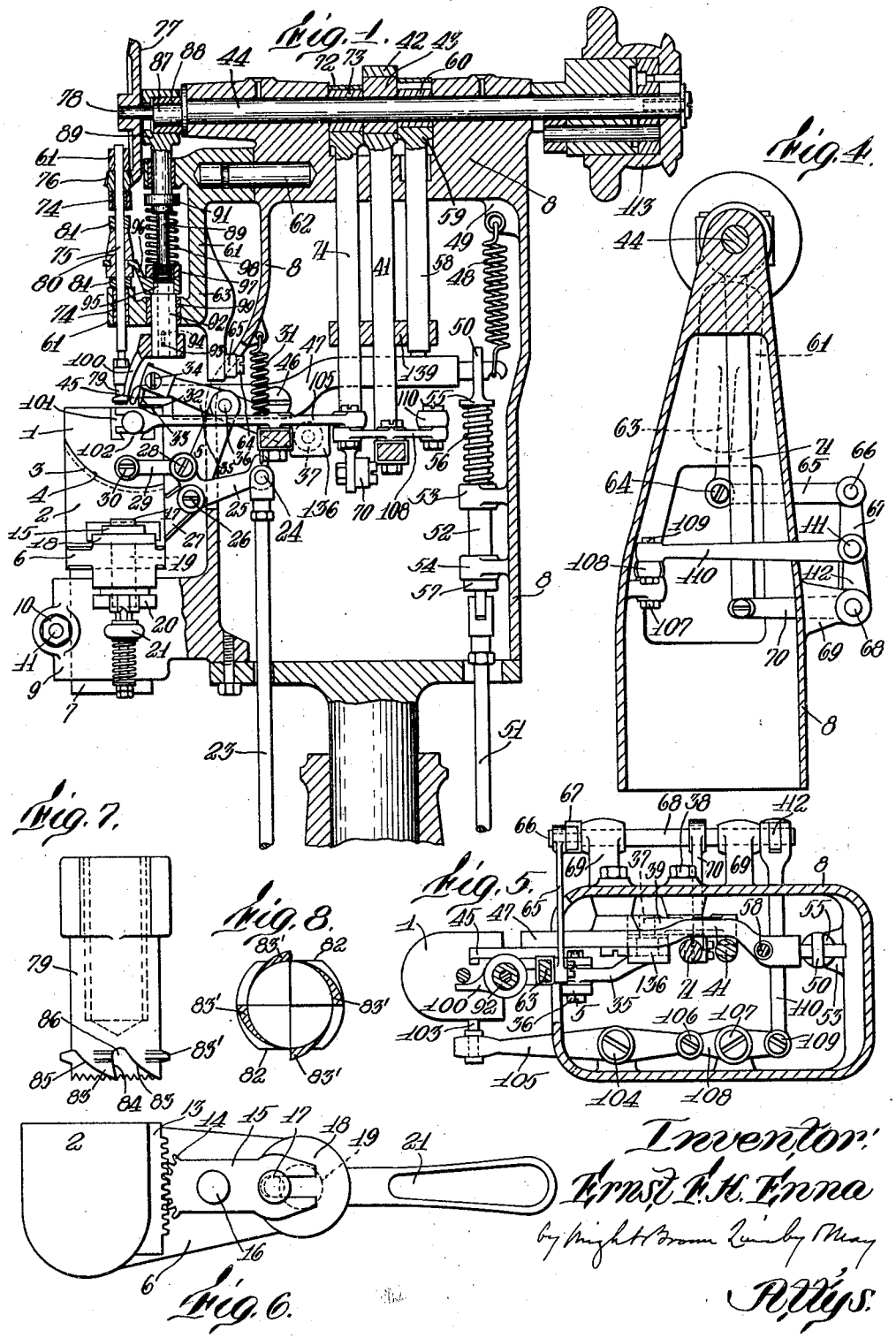

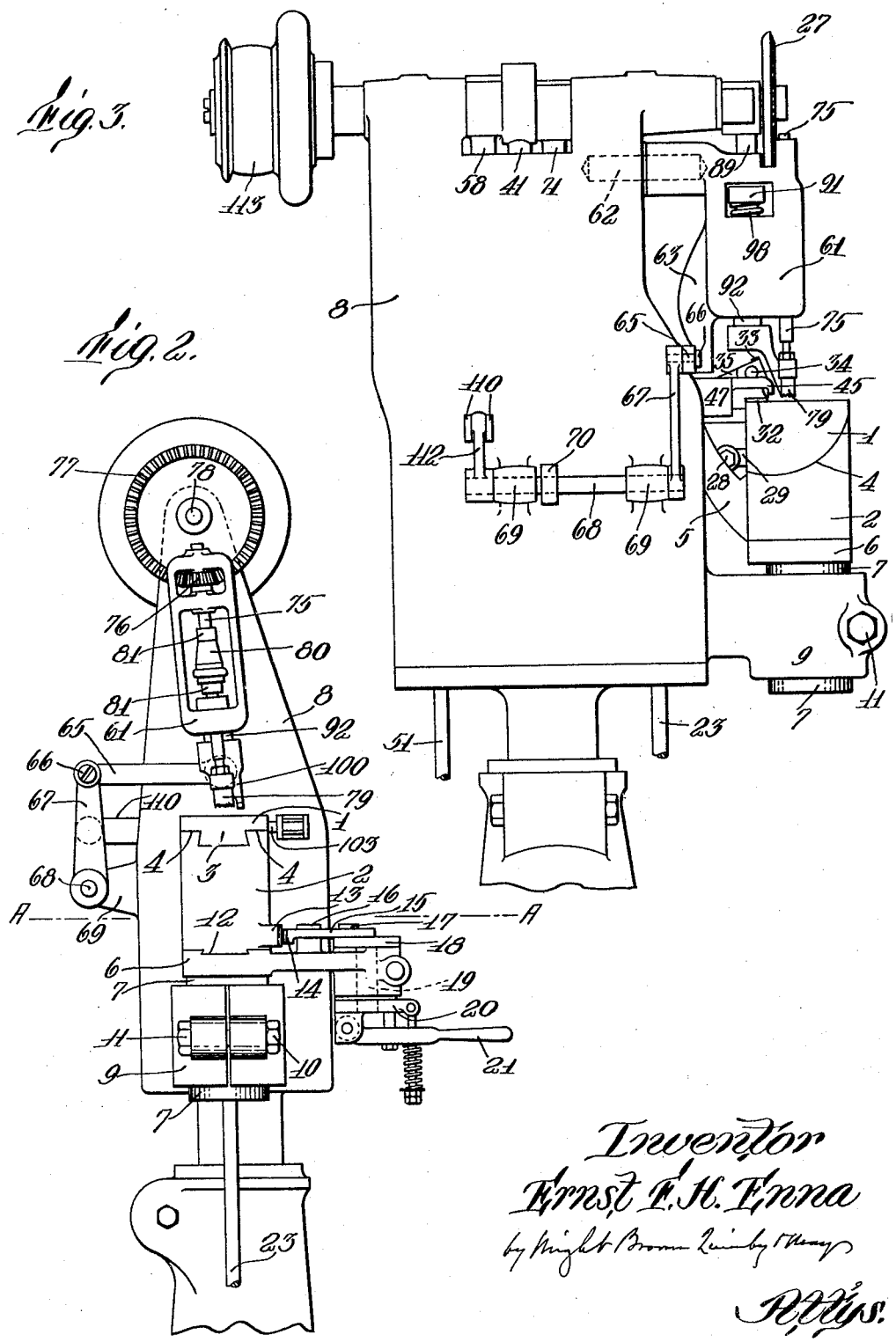

1,737,577

UNITED STATES PATENT OFFICE

ERNST FREDERIK HENRY ENNA, OF COPENHAGEN, DENMARK

APPARATUS FOR CUTTING CHANNELS IN PARTS OF FOOTWEAR

Application filed August 11, 1927, Serial No. 212,280, and in Denmark September 11, 1926.

The present invention relates to an apparatus for cutting grooves in shoe-parts, more especially in bottom parts such as soles, to produce a channel which follows the edge of the finished shoe-part. Such a channel is desirable in manufacturing shoes in which the members are united by adhesive such as crude rubber, colloidal solutions and the like. The channel serves to protect the adhesive against the damaging influences of light, air, dirt and the like. Moreover, the grooves serve to increase the effective area of the adhesive surface so that the parts are very securely united.

The invention further has for its object to effect the cutting of such grooves in a given part of the work so that the channel shall exactly match a corresponding channel, roughening or abrasion on the other part of the shoe to which it is to adhere.

The invention further has for its object to remove superfluous material from the work so that a preceding or subsequent cutting operation is either unnecessary or is greatly facilitated, and so that two parts to be united are fitted for each other.

The tool hitherto used for making such a channel generally consists of a series of circular blades provided with sharp teeth, in number corresponding to the width of the channel. The blades are ordinarily fastened on a common shaft so that all move with the same velocity. This arrangement produces a row of parallel grooves along the edge of the work which together form the channel desired. In the case of a sole intended for a more or less pointed shoe, the difficulty is encountered that by turning the work in relation to the cutting device or vice versa, part of the cutter travels in a curve back over the grooves cut into the inner part of the sole, whereby these grooves are ruined and, instead of a row of grooved divisions, a roughened cavity results. This not only weakens the work at this particular spot so that its wearing capacity is considerably diminished, but the roughened cavity is not serviceable for retaining the adhesive.

With the machine of this invention a plurality of cuts are made successively into the work by means of a rotating or rotating and bodily movable tool which forms circular grooves in the bottom of the channel.

The machine includes a rotary cutter furnished with one or more rows of toothed cutting edges radially arranged. This cutter is made to execute a number of successive cuts (circular recesses) so that part of each cut, for example, one half, is overlapped by the following cut; further the bottom of each recess—in which the said teeth produce concentric circular grooves—is in a plane inclined in relation to the surface of the work so that the depth of each cut gradually diminishes in the direction in which each cut is overlapped by the subsequent cut. In this way, in forming each and every cut there is in the part where the preceding cut is overlapped, enough substance in which to form the grooves.

The improved machine makes it possible without any difficulty whatever, to form the desired channel with a grooved bottom not only when such a channel follows a straight or a slightly curved line but also when it describes a sharp curve, as for instance when rounding the toe-part of a sole.

The main characteristics of the machine are a cutting device and a feed-mechanism contained in a housing which is suspended from a horizontal pivot so as to swing somewhat like a pendulum. That is to say, the swing is alternately with and against the feed-direction of the work placed upon the work table of the machine. The housing at all times is in such an inclined position that the cutter-axis and feed-rod parallel to it incline sideways in a direction opposite to that of the feed. When the housing is in its backmost position, the rotary cutter is lowered to cut down into the work and a feed rod also is pressed down upon the work so that the feed rod assisted by the continuously rotating cutter carries the work along during the swing of the housing into its foremost position. The feed rod and cutter are adjustable as to height to suit different thicknesses of work and to vary the depth of the cut. At the end of the feed the cutter and feed rod are lifted out of contact with the work and simultaneously a presser foot mechanism automatically engages and holds stationary the work while the housing with the cutter and feed rod swings back to its original position.

In the accompanying drawings,

Figure 1 is a sectional front elevation of these improvements.

Figure 2 is an elevation as seen from the left hand side of Figure 1.

Figure 3 is a rear elevation.

Figure 4 is a vertical cross sectional view of Figure 3.

Figure 5 is a horizontal sectional view of Figure 3.

Figure 6 is a sectional plan view along line A—A Figure 2.

Figure 7 is a side elevation of a cutter.

Figure 8 is an inverted plan of Figure 7.

Figure 9 is a side elevation showing a sole with template placed on the worktable of the machine, and a cutter and feed mechanism in working position.

Figure 10 is a plan of a sole partly worked upon.

Figure 11 is a longitudinal section on an enlarged scale of a sole which has been operated upon by the cutter, the line of the section passing along the groove or channel formed by the cutter.

In Figures 1, 2 and 3, the worktable 1 of the machine supports the material to be operated upon. The table rests on a block 2 and can tilt or turn about an imaginary axis contained in the plane of the table-top; for this purpose the table has on its bottom a rather broad dovetail rib 3, Figure 2, and the bottom surface is circular or cylindric, the top 4 of the block 2, being formed correspondingly to support and guide the table. The block 2 has an obliquely upwardly extending bracket arm 5, for a purpose hereinafter described, and rests on a lower part 6 supported by a large vertical pivot 7, which fits into a split socket 9, projecting from the machine body 8. The split socket 9 is tightened around the pivot 7 by means of a screw bolt 11 which is furnished with a nut or nuts 10 so that the block 2 and table 1 may be held fast at any desired elevation.

The block 2 engages the part 6 by means of a dovetail rib 12, Figure 2 so that guidance is obtained horizontally and perpendicularly to the axis about which the table can turn.

The shifting of the block 2 on the part 6 is effected by means of a rack 13 and toothed segment 14. The rack 13 is at the lower end and on one side of the block 2, see Figures 2 and 6, and the toothed segment 14 is formed at one end of a lever 15, turning about a pivot 16 upstanding from the lower part 6. The other end of the lever 15 is forked and engages a pivot 17 which is provided with a head or knob. The pivot 17 stands eccentrically on a circular disc 18 at the head of a short vertical shaft 19, which passes down through the lower part 6. On the lower end of the shaft 19 is affixed a disc 20, which is connected to a handle 21 by turning which, the disc 20 is turned together with the shaft 19 and the disc 18. Consequently the pivot 17 on the disc 18 turns the lever 15, and the toothed segment 14 meshing with the rack 13, causes the shifting of the block 2 upon the lower part 6.

A treadle (not shown) at the bottom of the machine is connected to the lower end of a rod 23, the upper end of the rod being hingedly connected at 24 to an arm 25 of a bell-crank lever pivoted to a bracket 27 on the block 2. The other arm of the bell-crank lever is pivotally connected at 28 with one end of a link 29, the other end of the link being pivotally connected at 30 with the table 1. When the said treadle is depressed, the parts 23, 25 and 29 cause the table 1 to turn anti-clockwise about the imaginary axis aforesaid. Above the pivot 24, the bell-crank lever 25 is connected to the lower end of a helical spring 31, the upper end of the latter being connected to the machine body, to return the parts 23, 25 and 29 to normal position, when the treadle is released. Thus the table 1 is automatically returned to normal position.

On the table 1 is suitably fastened a guide 32 Figures 1 and 3, for the work or for a template supporting the work. In order to facilitate the feed a movable support 101, Figure 1, hereinafter described, is inserted in the table 1.

The machine comprises a knife 33, Figures 1 and 3, for cutting off superfluous material from the work when this is too large. For this purpose the work is affixed to a template of correct shape and size and that part of the work which overhangs the template is cut away by the knife 33. The knife is secured by a screw 34 to the end of one arm of a lever 35 which turns upon a pivot 36 at the upper end of the oblique bracket 5 on the block 2. The other arm of the lever 35 has its end formed as a guide for a slide-block 360 (see Figure 5) bored so as to encircle a stud 37 which is affixed to one end of a rocker lever 39 turning upon a bolt 38. The other end of lever 39 is suitably hinged to the lower end of a vertical rod 41 which passes through a stationary guide-block 139 Figure 1, and has on its top end a strap 42 which surrounds an eccentric 43 on the main shaft 44. With each revolution of the main shaft, starting from the position shown in Figure 1, the knife 33 has a downward swing to execute a cutting-movement followed by an upward swing. The adjustment is such that when the knife has swung down to its lowermost position its edge is practically in the imaginary axis of tilting or turning of the table 1. As the lever 35 which carries the knife is supported by the bracket 5 upon the block 2, the position of the knife in relation to the table 1 remains unaltered when the latter is adjusted by the block 2 sliding upon the lower part 6. However, its absolute position is altered and this is possible because of the slide-block 36. When the table is turned around its before mentioned horizontal axis, the knife remains in the correct position in relation to the table, because the edge of the knife when swung down is practically speaking in the same axis.

To ensure that the work-piece placed upon the work-table 1 shall not inadvertently be moved, the machine is furnished with a presser foot 45, Figures 1, 3 and 5 on one end of a lever 47 rockable on a pivot 46. The other end of lever 47 is influenced by a helical spring 48, Figure 1, the upper end of which is connected to a lug 49 on the machine body 8, and which influences the lever 47 so as to push the presser foot 45 downwards. To place the work-piece upon the table 1 it is necessary to lift the presser foot, and for this purpose a treadle (not shown) is connected to the lower end of a rod 51, the upper end being connected to a vertical slider 52 having an eye 50 engaging the lever 47 near the point where the spring 48 acts upon this lever. The slider 52 is guided by two bearings 53 and 54 which are fast upon the machine body. Between the top bearing 53 and a collar 55 on the slider 52 a helical spring 56 is inserted to balance the weight of the slider 52 and rod 51. On the slider 52 below the lower bearing 54 is affixed a stop collar 57 which abuts against this bearing to limit the upward movement of the rod 51 and link 52. When the treadle is pressed downwards the parts 51 and 52 cause the lever 47 to turn to raise the presser foot, at the same time the spring 48 is tensioned and the spring 56 is compressed. As soon as the treadle is released, the spring 48 returns the lever 47 so that the presser foot 45 takes hold of the work-piece placed on the table 1, and simultaneously the spring 56 causes the rod 51 and the link 52 to return to normal position. Movement of the presser foot while the machine is running is automatically regulated through a cam 60 on the main shaft 44 encircled by a ring 59 on the upper end of a rod 58 which passes through the guide member 139 and the lower end of which can act upon the presser foot lever 47.

To produce the desired channel in the work and form grooves in the bottom of said channel the machine is furnished with a cutting device and a feeding-mechanism for feeding the work and co-acting with the cutter. These two mechanisms are for the main part contained in a joint housing 61, Figures 1, 2 and 3, suspended so as to turn upon a relatively short horizontal pivot 62 which is partly inserted into and fastened in a bore in the machine frame 8, see especially Figure 1. The housing 61 has on its right hand outside (Figure 1) a rib 63 somewhat prolonged downwards, see also Figure 4, the lower end of which by a stud 64 forms a hinged connection with one end of a link 65, see especially Figure 2. The other end of the link 65 is hingedly connected by a stud 66 to the end of an upright arm 67, fixed on a horizontal shaft 68 placed at the back of the machine and carried in a pair of bearings 69 on the machine body 8. On the shaft 68 is fastened an arm 70 which is nearly horizontal, Figures 3, 4 and 5, and the end of this arm is connected to a nearly vertical eccentric rod 71, which passes through the guide 139 and has on its upper end a ring or strap 72, which encircles a cam 73 on the main shaft 44. When the machine is running, this cam by means of the rod 71 and the arm 70 causes the shaft 68 to oscillate through a certain angle around its proper axis, and this movement is transmitted through the parts 67 and 65 to the housing 61, so that it swings as a pendulum upon the horizontal pivot 62. The adjustment is such that the longitudinal centre line of the housing 61 passing through the axis of pivot 62 always inclines towards the same side of the vertical.

The cutting device is constructed in the following manner:

In the housing 61, a shaft 75 is mounted so as to be revolvable and axially shiftable in its bearings 74. Near the upper end of the shaft there is a bevel wheel 76, which cannot revolve in relation to the shaft although the latter is siftable through the wheel. The housing prevents any axial shifting of the wheel 76, see Figure 2. The wheels 76 meshes with a larger bevel wheel 77 fastened on an extension 78 (Figure 1) of the main shaft 44. A cutter 79 is fixed to the lower end of the shaft 75 by screw or other means and between the two bearings 74 the shaft loosely passes through a sleeve 80 held in its place upon the shaft between two rings 81 fastened thereon. These rings restrict the axial shifting movements of the shaft and at the same time prevent the shaft and sleeve from being shifted axially in relation to each other.

The construction of the cutter must to some extent depend upon quality of the material to be worked upon, and one suitable construction is shown in Figures 7 and 8. The cutter shown consists of a body mainly cylindric with a screw threaded bore for the lower part of the cutter shaft. The upper part of the said body has a slightly enlarged diameter but is so flattened on opposite sides that in these places two planes 82 are formed to serve for example as a rest or grip for a wrench, when the cutter is screwed on to the cutter shaft. On the lower end of the cutter body radial cutting-edges 83 are formed and provided with saw-teeth, the plane 84 of a tooth being preferably slightly inclined forwardly in the direction of rotation of the cutter. The rear surface 85 of each cutting edge and the connecting surface 86 between the surface 85 and the front surface 84 of the next cutting edge (in case there are several such) or the merging of the rear surface into the bottom surface of the cutter body must be formed so that the cuttings or chips can for the main part be removed during the cutting operation, and so that the friction occasioned by cutting into the work may be diminished and thereby prevented from causing a heating of the work sufficient to damage it. For cutting away the torn fibres that may appear along the edges of the channel cut into the work when this is of a loose fibred substance teeth 83' are formed around the circumference of the bottom end of the cutter see Figure 8.

The feeding mechanism is constructed in the following manner: Between the main length of the shaft 44 and its reduced extension 78, Figure 1, the shaft is formed as an eccentric 87 encircled by a sleeve 88 inserted into the horizontally forked top end of a rod 89, see also Figure 3. This rod passes down through a guide bearing 90 at the top of the housing 61. At a short distance underneath the bearing 90 there is a collar 91 screwed or fixed upon the rod 89. The lower portion of the rod 89 is loosely encircled by a sleeve 92, which carries a pin 93 that fits into a short groove 94 in the rod 89. The upper portion of the sleeve 92 is slightly reduced whereby an annular shoulder 95 is formed. Upon this shoulder rests a ring supporting a carrier 96 and held fast by a ring 97, which is screwed upon the sleeve 92 above the said ring. A spring 98 coiled around the rod 89 is inserted between the collar 91 and the ring 97. The carrier 96 inclines upwardly from its ring and engages a circular groove cut in the sleeve 80 so that in this way the feed mechanism and the cutter mechanism are coupled together. The sleeve 92 passes through a guide bearing 99 formed in the bottom part of the housing 61 and carries a feeder 100 at its lower end. Through the agency of the spring 98 the feeder and the cutter are during their operating periods, pressed on to the work with a fairly constant pressure even if the thickness of the work varies somewhat in the different parts, inasmuch as the sleeve 92 is to some extent siftable upon the rod 89, either against the action of the spring 98 or under influence of same, and the carrier 96 forces the cutter shaft 73 to follow these shifting movements of the sleeve 92. The cutter shaft and the rod 89 are parallel and, apart from the said possible slight axial shift of the cutter shaft in relation to the rod 89, the carrier 96 compels these two members to move together axially.

The movable support 101 aforesaid which serves to aid in feeding the work and is inserted into a cavity of the work table 1, has in its lower surface a dovetail groove which engages a corresponding rib 102 formed on the bottom of the said cavity. The support 101 has a strip 103, Figure 5, forming a pivot connection with one end of a lever 105. Figures 1 and 5, which turns upon a stationary vertical pivot 104. The other end of lever 105 is hingedly connected to one arm of a lever 108 mounted on a vertical pivot 107, and the other arm of lever 108 is hingedly connected by a pin 109 with one end of a link 110 which is pivotally connected at 111, see Figure 4, with the end of an arm 112 projecting upwards from the oscillating shaft 68. The parts 112, 110, 108 and 105 therefore cause the movable work support 101 to move forward and backward in time with the swinging of the housing 61 about its pivot 62 and so that the support moves left or right (seen from the left side of the machine in Figure 1, see also Figure 3) when the housing swings left or right. It is to be observed that leftward movement of the support is in the direction in which the work is fed.

On the main shaft 44 of the machine is placed a pulley 113 over which runs a belt (not shown) from a source of power. The starting and stopping device necessary may be of a known construction and is therefore not mentioned in detail.

The operation of the machine is as follows:—

After a piece of work 114, Figure 9 has been placed upon the movable support 101 of the table 1 to be operated upon (in the figure the works is assumed to be a sole which is still too large and therefore affixed to a template 115), the housing takes a position as shown in Figure 9. That is, a position in which the axis of the cutter shaft 75 and the axis of the rod 89 with the sleeve 92 supporting the feeder 100 incline downwards to the right, seen from the left side in Figure 1, so that they form an angle of, for instance 10° with the perpendicular. The eccentric rod 58 is in its top position so that the presser foot 45 is down. The eccentric rod 41 is in its top position so that the knife 33 is lifted through the agency of the levers 39 and 35. The eccentric rod 71 is nearly in its bottom position and through the agency of the shaft 68, the arm 67 and the link 65 causes the housing 61 to take the position above mentioned. The eccentric 87 on the main shaft 44 is in such a position that the cutter 79 is in contact with the sole 114 through the action of the spring 98, whereby the sleeve 92 at this stage is so lifted in relation to the eccentric rod 89 that the pin 93 in the sleeve is nearly at the top end of the groove 94 in the rod 89. When the machine is started, the following will occur during one revolution of the main shaft 44: The cam 60 through the rod 58 causes the presser foot 45 to swing up and out of contact with the sole 114. By means of the bevel-gears 77 and 76 the cutter shaft 75 and the cutter 79 are at once made to revolve and the cutter cuts a circular recess into the sole 114, whereupon the feeder 100 is timed to act upon the sole. The housing 61 and the cutter and feed now swing to the left, Figure 9, during which movement the feeder takes the sole 114 along, assisted by the constantly rotating cutter. The feeding of the sole is facilitated by the movable support 101 which, through the mechanism 112, 110, 108, 105 and 103 is shifted in exact correspondence to the distance which the sole is to be moved. On account of the inclined position of the cutter, the bottom of the circular recess is cut deeper down in the half foremost in the feeding direction of the sole than in the other half. It is supposed that the cutting edges of the cutter are furnished with sawteeth, and these teeth form circular grooves 116, see Figures 10 and 11, in the bottom of the recess. The swing of the housing 61 to the left and the consequent feed to the left of the sole is only slight, not more so than to make the feed nearly equal to the radius of the cutter. In its extreme leftward position the cutter shaft 75 still inclines to the right, Figure 9. After the first half revolution of the main shaft 44 the eccentric 87 has lifted the rod 89 with its sleeve 92, and the carrier 96 lifts the cutter shaft 95 with it so that the cutter 79 and the feeder 100 are quite out of contact with the sole 114. At the same time, the eccentric rod 58 is brought into such a position that the spring 48 by acting upon the lever 47 forces the presser foot 45 down upon the sole so as to hold same fast. During the following half revolution of the main shaft the housing 61 the cutter and the feeder swing to the right back to the starting position, and the eccentric 87 causes the cutter and feeder to return to operating position, so as to repeat the cutting and feeding operation when the housing 61 again swings to the left. The circular recess now cut into the sole overlaps the first recess by about one half. During each revolution of the main shaft, the knife 33 will be swung down and up again so that the knife cuts away the superfluous material of the sole 114, namely, the part of the sole overhanging the template 115.

Thus, a groove or channel is produced in the sole 114, the sides of which are made up by portions of the outermost grooves of all the circular recesses, and in the bottom of the channel there are groups of circular grooves 116, Figures 10 and 11, produced by the teeth in the cutting edges of the cutter. Each group of grooves, as far as the mode of operation here shown and described is concerned, consists of a number of concentric circular grooves i. e. the number of grooves formed in a single cutting operation. All the grooves are distinct and uniform in spite of the fact that part of each of circular recess, excepting, of course, the last one, is overlapped by the next following recess. This result is obtained by using a cutter which inclines in the direction mentioned above. The consequence is that the bottom 118, Figure 11, of each recess is in a plane inclined in relation to the surface of the work at such an angle that the depth, seen in a diametrical vertical section, diminishes in the feed direction of the work. Thus that part of a recess which is overlapped by part of the next following recess has less depth than the overlapping part so that the latter is cut into fresh substance of the work. The said inclination further has the effect that between each group of grooves 116 and the next following one there is a proportionately deep segmental step, there being relatively deep grooves or cuts 117 at the foot of each step. This stepping will be produced just in the same way, even if the cutter is not toothed, but the steps will then appear as at 119 in Figure 11.

By adjusting the work-table 1, by shifting the block 2 upon the lower part 6, the distance from the outer edge of the groove channel to the edge of the finished piece of work is regulated as desired. It will be remembered that the knife 33 follows up this adjustment of the work-table, because the lever carrying it is suspended upon the bracket 5 on the block 2.

When the work at a certain part has an oblique surface such as may be produced by feathering, and the desired channel has to pass along such part, necessary provision for this special case may be made through the feature that the table 1 by means of the parts 23, 25 and 29 which are inter-connected by a treadle is adjusted on the block 2 about the imaginary axis so that the oblique surface-part of the work is brought practically to horizontality. As the knife 33 acts upon a part of the work which lies practically in the said axis, the knife will continue to work correctly.

It is observed that the knife 33 is so curved that it will always cut at a right angle, or nearly so, to the surface of the work.

Having now particularly described and ascertained the nature of my said invention, and in what manner the same is to be performed, I declare that what I claim is:

1. In a machine for the purpose described, the combination of means for supporting a shoe-part, and means for producing a series of circular cuts in communicating relation to provide a channel extending parallel to an edge of the shoe-part, each of said circular cuts varying in depth in the direction of the length of the channel.

2. In a machine for the purpose described, the combination of means for suporting a shoe-part, a cutter adapted to form a circular cavity in a shoe part on said support, and means for effecting relative movement between the cutter and shoe-part to form a succession of cuts in overlapping relation in the direction of the length of the shoe-part.

3. In a machine for cutting channels in shoe-parts, the combination with a support for the part to be treated, a cutter adapted to cut a circular cavity, means for effecting relative movement between said support and cutter substantially in the direction of the length of the axis of the cutter to bring the cutter into operative relation to a shoe-part on the support, and means for effecting relative movement between the cutter and shoe-part whereby successive operations of the cutter will produce overlapping cavities in the shoe-part.

4. In a machine for cutting channels in shoe-parts, the combination with a support for the part to be treated, a rotary cutter adapted to cut a circular cavity, means for effecting relative movement between the support and cutter substantially in the direction of the length of the axis of the cutter to position the cutter into and from operative relation to a shoe-part on the support, means for feeding the part to be treated transversely of the axis of the cutter, said axis being inclined in a direction oblique to the line of feed of said part, whereby successive operations of the cutter will produce overlapping cavities in the shoe-part the bottom of each cavity being inclined in the direction of the feed of the part operated on.

5. In a machine for the purpose described, the combination of a support for the part to be treated, a cutter, means for effecting relative movement between the cutter and support for causing the cutter to form a channel in a shoe-part on the support, a template, and means cooperating with the template for giving the channel a predetermined form in the direction of its length.

6. In a machine for the purpose described, the combination of a support for the part to be treated, a cutter, means for effecting relative movement between the cutter and support for causing the cutter to form a channel in a shoe-part on the support, a template, means cooperating with the template for giving the channel a predetermined form in the direction of its length, and a trimmer adapted to remove portions of the part projecting more than a predetermined distance from the channel to form an edge parallel with the channel.

7. In a machine for the purpose described, the combination of a support for a shoe-part to be treated, a cutter adapted to make a circular cut, means for effecting relative movement between the support and cutter substantially in the direction of the length of the axis of the cutter, means for effecting relative movement between the cutter and a shoe-part on the support in a direction transverse to the axis of the cutter, and means for preventing movement of the shoe-part when it is not engaged by the cutter.

8. In a machine for the purpose described, the combination of a support for a shoe-part to be treated, a cutter, adapted to make a circular cut, supported to rock about a substantially horizontal axis above the support, and to be moved to and from position to operate on a shoe-part on the support, means for moving the cutter into such operative position at one end of each oscillation thereof and subsequently moving it from engagement with the part being treated, and means for retaining the shoe-part in position when the cutter is elevated therefrom.

9. In a machine for the purpose described, the combination of a support for a shoe-part to be treated, a cutter adapted to make a circular cut, supported to rock about a substantially horizontal axis above the support, and to be moved to and from position to operate on a part on the support, means for moving the cutter into such operative position at one end of each oscillation thereof and subsequently moving it from engagement with the part being treated, and means for effecting relative movement between the cutter and shoe-part to feed the part being treated past the cutter, the axis of the cutter being inclined in a direction opposite that of the said feeding movement.

10. In a machine for the purpose described, the combination of a support for a shoe-part to be treated, a cutter, adapted to make a circular cut, supported to rock about a substantially horizontal axis above the support, means for moving the cutter toward and from the support, and means for feeding a shoe-part on the support relative to the cutter mounted to move with the cutter toward and from the support.

11. In a machine for the purpose described, the combination of a support for a shoe-part to be treated, a cutter supported to rock about a substantially horizontal axis above the support, a device for feeding the work relative to the cutter, supported to move with the cutter about said axis, means for moving the feed device and cutter to and from the work support, and connections between the cutter and feed device whereby the feeding device will bear with uniform pressure on parts of different thickness on the support.

12. In a machine for the purpose described, the combination of a support for a shoe-part to be treated, a frame mounted to rock about a substantially horizontal axis above the support, a power shaft above the holder, an eccentric on said shaft, a rod supported by the swinging frame and connected to the eccentric, a cutter shaft in said frame extending parallel to said rod, gearing connecting the power and cutter shafts, a sleeve on said rod provided with a device for feeding the work relative to the support as the cutter frame is oscillated, a spring acting to press the feed device against the work, and an arm extending from said sleeve and engaging the cutter shaft, whereby the cutter will be moved to and from the work with the feed device.

13. In a machine for the purpose described, the combination of a support for a shoe-part to be treated, a cutter carrying frame mounted to rock about a substantially horizontal axis above the support, a cutter adapted to make a circular cut supported in said frame, a power shaft, an eccentric on said shaft, means actuated by said eccentric for moving the cutter longitudinally of its axis in the frame into and from operative relation to a shoe-part on the support, gearing connecting the power shaft and cutter for rotating the cutter, and means actuated by the power shaft for rocking the cutter supporting frame about its axis, for the purpose described.

14. In a machine for the purpose described, the combination of a support, a work table mounted on the support and adapted to be adjusted about an axis lying in the plane of the surface of the table, a cutter supported above said table, and means for feeding a shoe-part over said table in the path of the cutter and on a line substantially parallel to said axis.

15. In a machine for the purpose described, the combination of a support, a work table mounted on the support and adapted to be adjusted about an axis lying in the plane of the surface of the table, a cutter supported to oscillate about an axis above the table, a work holder movable relative to the table to feed a shoe-part to be treated over the surface of the table in the path of the cutter, and means for oscillating the cutter support and reciprocating said holder in unison.

In testimony whereof I have affixed my signature.

ERNST F. H. ENNA.